United States Patent Office 3,367,122
Patented Feb. 6, 1968

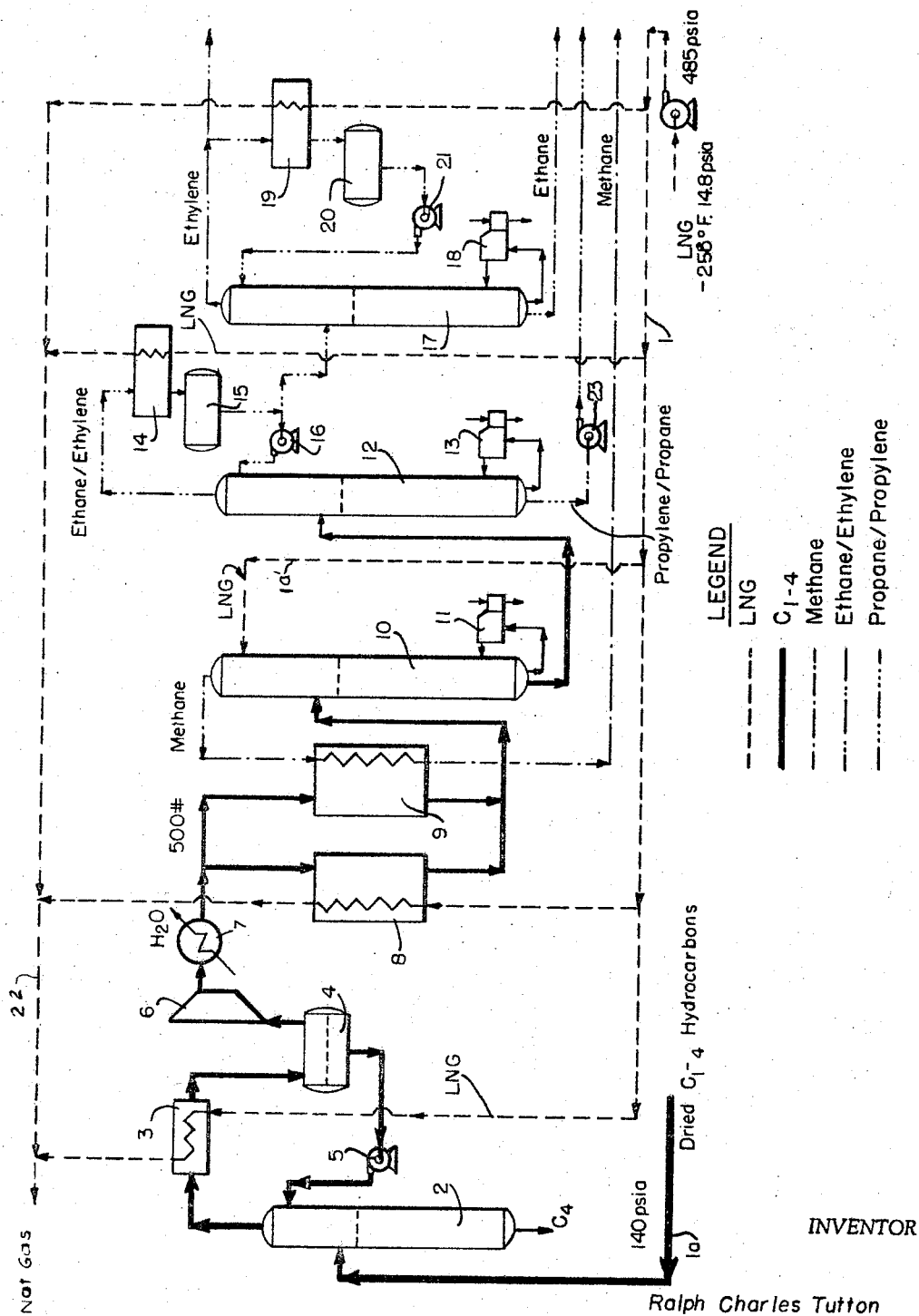

3,367,122
REGASIFYING LIQUEFIED NATURAL GAS BY
HEAT EXCHANGE WITH FRACTIONATOR
OVERHEAD STREAMS
Ralph Charles Tutton, Teddington, Middlesex, England,
assignor to Conch International Methane Limited, Nassau, Bahamas, a Bahamian company
Filed Jan. 25, 1965, Ser. No. 427,615
Claims priority, application Great Britain, Mar. 12, 1964,
10,482/64
10 Claims. (Cl. 62—28)

ABSTRACT OF THE DISCLOSURE

Liquid natural gas is converted to gaseous form for general use, and at the same time separation is achieved of the components of an independent mixture such as cracked naphtha or a refinery gas stream, said mixture comprising $C_{1-4}$ hydrocarbons, by the use of separate fractionating columns, in each of which the necessary cooling is achieved by a separate stream of liquefied natural gas derived from the main stream thereof which has been previously pressurized, the liquefied natural gas being used in the methane separation fractionator as a direct reflux.

---

The bulk transportation in marine vessels of liquefied natural gas, herein referred to as LNG, provides large quantities of fuel at a very low temperature which is far below that desired for general handling and distribution. When so transported, the product needs to be regarded both as a fuel and as a refrigerant and a primary object of the present invention is the regasification of LNG so that it is both at a temperature and a pressure suitable for handling and distribution. A further object of the present invention is the utilization of the refrigerating capacity or potential of LNG.

In the provision of lower $C_{1-4}$ hydrocarbons, various processes are now available. As a result such products form the main or major constituents in various refinery gas streams or may form the main constituents of a cracking operation applied for instance to a naphtha or ethane or propane or mixtures thereof alone or with butane. The separation of a gas mixture comprising $C_{1-4}$ hydrocarbons wherein both saturated and unsaturated products are present poses a technical problem which has been resolved only by the provision of elaborate separation techniques. These are costly in terms of initial installation and often expensive in terms of the power and utilities consumption during operation. So much is this the case that the separation costs often bulk large in the costs of providing individual hydrocarbons several of which, as for instance ethylene and propylene are now used as raw materials for various chemical syntheses. Still a further object of the present invention is to provide a means of separating such gas mixtures effectively and at moderate cost making use of the refrigerating potential in LNG.

According to the present invention a process of regasifying LNG to a product at temperatures and pressures suitable for normal pipeline distribution consists in using the pressurized LNG in part as direct reflux and in part as indirect heat exchange with reflux streams in a fractional condensation of a gaseous mixture consisting of or comprising $C_{1-4}$ hydrocarbons. According to a further feature of the invention in a process for separating the components of a mixture consisting of or comprising lower $C_{1-4}$ hydrocarbons wherein the mixture is chilled and condensed sufficiently to separate $C_4$ hydrocarbons, methane, ethane, ethylene and propane, the chilling and reflux cooling operations are effected with the aid of a stream of LNG under pressure so that the latter is gasified to a product in a state suitable for pipeline distribution.

The mixture to be separated may be compressed and fed to a first fractionator which effects separation of $C_4$ and heavier hydrocarbons (LNG being used as refrigerant to condense reflux), and subsequently demethanized after further compression and partial condensation through heat exchange with more LNG. The debutanized mixture after further compression and partial condensation through heat exchange with LNG may be demethanized in a second fractionator. If desired, the latter may be provided with a stream of the LNG as a direct reflux and in this event the tail gas recovered will be partly made up of vaporized LNG. Such recovered tail gas will of course still be at a decidedly low temperature and may be used to supplement the LNG in chilling and partly condensing the gas mixture on its way to the demethanizer.

The demethanized and debutanized liquefied feed may then pass to a third fractionator where ethane/ethylene mixture is separated, again with cooling of the reflux stream by the LNG. The ethane/ethylene mixture is passed to one or more splitting columns where the two components are subsequently separated, again with reflux cooling with the aid of LNG.

The stream of LNG split up for the various purposes set forth above is reunited at a considerable higher temperature having taken up a considerable amount of heat from the gas mixture, and being then in a state suitable for pipeline distribution.

Clearly the foregoing operations can be subject to detail modifications depending on the nature and composition of the gas mixture to be separated. The process can be effected with a very considerable saving in power consumption over that which would be required if no refrigerant were available in bulk supply. It thus offers most attractive economies while simultaneously providing a stream of natural gas at temperatures which are acceptable for handling and distribution purposes.

Moreover, it will be evident that the provision of a bulk supply of LNG in the amount which matches the refrigerating duties involved in separating a gas mixture which may change both in quantity and in composition cannot always be realized. There will be cases when the amount of LNG available is in excess of requirements in which event the LNG will also need to be used in heat exchange in the separation of heavier components from the gas mixture or in the preliminary cooling of the mixture before taking out the $C_4$ hydrocarbons. There will be cases when the amount of LNG available is insufficient and in this event the LNG will be channelled into those condensation operations where it is more particularly effective as for instance the partial condensation associated with, and the direct reflux to, the demethanizer.

The invention will now be described by reference to the accompanying drawing which sets out diagrammatically a flow sheet of a process according to the present invention for separating a gas mixture containing $C_{1-4}$ saturated and unsaturated hydrocarbons derived from a naphtha cracking operation. This mixture from which heavier components have already been removed, has the following approximate molar percentage of components:

| | |
|---|---|
| $H_2$ | 8.5 |
| $CH_4$ | 26.0 |
| $C_2H_4$ | 21.0 |
| $C_2H_6$ | 9.0 |
| $C_3H_6$ | 30.0 |
| $C_3H_8$ | 5.0 |
| $C_4H_8$ | 0.5 |
| | 100.0 |

The refrigerant is a stream of LNG at a temperature of −258° and under pressure which enters via line 1. The dried gas mixture of $C_{1-4}$ hydrocarbons in line 1a, compressed to about 140 p.s.i.a., enters a fractionator 2 and in passing from the column is chilled by LNG in heat exchanger 3, whereby $C_4$ hydrocarbons are substantially eliminated, the reflux to column 2 returning via reflux vessel 4 and pump 5.

The dried gas mixture substantially debutanized leaves the reflux vessel 4 at about 25° F. and passes to a gas compressor 6. The compressor brings the mixture to 500 p.s.i.a. and some of the heat of compression is first removed in heat exchanger 7 by cooling water, the temperature of the mixture emerging being about 90° F. The stream of gas under pressure then spits between two heat exchangers 8 and 9; in the first of these it is again chilled by part of the LNG stream, and in the second by cold tail gas. The recombined stream partially liquefied and at a temperature of −75° F. passes to a demethanizer column 10, provided with a reboiler 11. A part of the LNG from line 1 enters this column as a direct reflux in line 1a'. Tail gas removed from the column 10 at a temperature in the region of −150° F. passes to heat exchanger 9 where it serves to partially condense a part of the incoming gas mixture. It can thereafter either be sent on as fuel or if desired combined with the main stream of LNG which has taken up heat in the course of the various condensing and fractionating procedures arising in the separation process of the present invention.

The demethanized and debutanized liquefied gas mixture drawn off from the foot of column 10 passes to deethanizing column 12 provided with reboiler 13. Here an ethane/ethylene mixture is separated out with reflux cooling by part of the LNG in heat exchanger 14, reflux being returned via reflux vessel 15 and pump 16. A stream of propylene/propane is drawn off the foot of column 12 via pump 23 and the ethane/ethylene mixture passes overhead to splitter column 17, provided with reboiler 18. Ethylene is recovered as an overhead stream, reflux cooling again being provided by part of the LNG in heat exchanger 19. The reflux returns via reflux vessel 20 and pump 21 to column 17 from the bottom of which a stream of ethane is drawn off.

In the course of these successive fractionations the pressure in the successive columns is reduced. Thus in the demethanizer the operating pressure is about 485 p.s.i.a., in the deethanizer column about 395 p.s.i.a., and in the splitter column about 295 p.s.i.a.

The LNG used for heat exchange purposes as set forth above is recombined in line 22 and this recombined stream is at a temperature and pressure at which it can quite satisfactorily pass into a distribution system.

A plant designed on the foregoing lines and taking about 174,000 lbs./hour of a gas mixture as set forth above operates with an LNG supply of between 207,000–208,000 lbs./hour and a very high saving of refrigerating power from this bulk supply of refrigerant.

It will be understood that the foregoing arrangements can be modified in various details with changes in the composition of the gas mixture to be separated and the aforesaid flow sheet and description is given for the purposes of illustrating more clearly how the invention may be performed. Thus for instance it may be expedient to provide demethanizer column 10 with indirect heat exchange using LNG as refrigerant. Moreover the operating pressure specified above can be varied considerably for given mixtures and in some cases it may be entirely feasible to eliminate further compression by compressor 6.

It will be apparent that the embodiments shown are only exemplary and that various modifications can be made in construction and arrangement within the scope of the invention as defined in the appended claims.

I claim:

1. A process for regasifying liquefied natural gas while separating out the components of a mixture comprising $C_{1-4}$ hydrocarbons, comprising:
   (a) chilling and condensing the mixture sufficiently to separate out $C_4$ hydrocarbons in a depropanizer,
   (b) removing substantially $C_{1-3}$ hydrocarbons overhead to a demethanizer fractionator,
   (c) removing the bottoms from the demethanizer to a deethanizer fractionator to provide an ethane-ethylene overhead,
   (d) separating the ethane-ethylene overhead in an ethane-ethylene splitter,
   (e) passing the liquefied natural gas in parallel heat exchange with the overhead of the depropanizer, deethanizer and splitter to gasify the liquid natural gas for pipeline distribution.

2. A process as claimed in claim 1 wherein the said step of separating out methane is carried out in a fractionating column in which the liquid natural gas serves as direct reflux and heat exchange of the other fractionating steps in an indirect heat exchange, the said withdrawn portions of liquid natural gas being subsequently recombined as gaseous natural gas product.

3. A process as claimed in claim 1 wherein the liquid natural gas is pressurized and used in part as direct reflux in the demethanizer and in part in indirect heat exchange with the overhead vapors in the remaining fractionating stages.

4. A process as claimed in claim 3, wherein the pressurized liquid natural gas is used in part as direct reflux in a demethanizer and in part in indirect heat exchange with the reflux from one or more of the columns separating $C_4$, $C_3$ and $C_2$ hydrocarbons.

5. A process as claimed in claim 3, wherein the pressurized liquid natural gas is converted to the desired temperature and pressure by splitting it into a series of streams which severally effect a separation by fractional condensation, in separate fractionating columns, of $C_4$, $C_3$, $C_2$ and $C_1$ hydrocarbons from the mixture by refluxing at least part of the overhead product of the respective columns, cooling by indirect heat exchange with liquid natural gas the overhead streams from depropanizer deethanizer and splitter columns to form said reflux and utilizing a portion of liquid natural gas as direct reflux to the demethanizer column, the said series of liquid natural gas streams used for indirect heat exchange being subsequently recombined.

6. A process as claimed in claim 5, wherein a stream of liquid natural gas also serves to cool through indirect heat exchange the feed to the demethanizer.

7. A process as claimed in claim 1 wherein the compressed and chilled mixture is fed to a first depropanizer fractionator wherein $C_4$ and any heavier hydrocarbons are separated, liquid natural gas being used to condense reflux for the depropanizer and the mixture subsequently demethanized after further compression and partial condensation through heat exchange with liquid natural gas.

8. A process as claimed in claim 7, wherein the overhead from the depropanizer is demethanized in a fractionating column in which the liquid natural gas also serves as a direct reflux, and the tail gas from the methane separation is also used to chill the overhead.

9. A process as claimed in claim 8, wherein condensed mixture from the demethanizer passes to the deethanizer in which the ethane-ethylene mixture is separated as overhead with cooling of the reflux by the liquid natural gas, and a propylene-propane mixture is drawn off as bottoms from said deethanizer fractionator.

10. A process as claimed in claim 9, wherein the mixture of ethane-ethylene is passed to a splitting column, the reflux from which is cooled by the liquid natural gas, and ethylene recovered as an overhead stream.

References Cited

UNITED STATES PATENTS

| | | | |
|---|---|---|---|
| 2,777,305 | 1/1957 | Davison | 62—28 XR |
| 3,261,169 | 7/1966 | Harmens | 62—40 XR |
| 3,276,212 | 10/1966 | Ichihara | 62—28 XR |

NORMAN YUDKOFF, *Primary Examiner.*

V. W. PRETKA, *Assistant Examiner.*